(12) United States Patent
Guo et al.

(10) Patent No.: US 11,997,228 B2
(45) Date of Patent: May 28, 2024

(54) DEVICE FOR RECOGNIZING APPLICATION IN MOBILE TERMINAL AND TERMINAL

(71) Applicant: Huawei Technologies Co., Ltd., Shenzhen (CN)

(72) Inventors: Jingrui Guo, Shanghai (CN); Lingyan Li, Shanghai (CN); Haoran Jiang, Shanghai (CN); Jiangxiong Li, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 327 days.

(21) Appl. No.: 17/350,957

(22) Filed: Jun. 17, 2021

(65) Prior Publication Data
US 2021/0342138 A1 Nov. 4, 2021

Related U.S. Application Data

(63) Continuation of application No. PCT/CN2018/121856, filed on Dec. 18, 2018.

(51) Int. Cl.
*G06F 9/46* (2006.01)
*G06F 8/61* (2018.01)
*G06F 9/445* (2018.01)
*G06F 9/455* (2018.01)
*G06F 9/54* (2006.01)
*G06F 18/24* (2023.01)
(Continued)

(52) U.S. Cl.
CPC .......... *H04M 1/72403* (2021.01); *G06F 8/61* (2013.01); *G06F 18/24* (2023.01); *G06N 20/00* (2019.01);
(Continued)

(58) Field of Classification Search
CPC ............. G06F 16/9566; G06F 3/04817; G06F 3/0482; G06F 16/434; G06F 16/9554; G06F 8/61; G06F 18/24; G06F 9/542; G06F 9/4451; G06F 3/0481; G06F 9/466; G06F 3/002; H04M 1/724; H04M 1/72403; G06N 20/00; G06V 10/955; G06V 20/60; H04W 88/02; H04W 4/023; H04W 4/80; H04L 65/60; H04L 67/52; H04L 67/10;
(Continued)

(56) References Cited

U.S. PATENT DOCUMENTS 9,063,574 B1 6/2015 Ivanchenko
10,565,760 B2 * 2/2020 Sullivan .................. H04L 65/60
(Continued)

FOREIGN PATENT DOCUMENTS

CN 102298533 A 12/2011
CN 103268151 A 8/2013
(Continued)

*Primary Examiner* — Thuy Dao
(74) *Attorney, Agent, or Firm* — Leydig, Voit & Mayer, Ltd.

(57) ABSTRACT

A device for recognizing an application in a mobile terminal includes: a coprocessor, configured to identify an image obtained by a signal processing device to obtain a first image category, and determine a first application corresponding to the first image category; and a main processor, configured to receive an identifier of the first application from the coprocessor, and activate the first application or prompt a user to download the first application. The device can relatively accurately determine, based on an image from an image sensor, an application that the user may want to use, and activate the application.

21 Claims, 10 Drawing Sheets

(51) Int. Cl.
    *G06N 20/00*     (2019.01)
    *G06V 10/94*     (2022.01)
    *G06V 20/60*     (2022.01)
    *H04M 1/72403*     (2021.01)
    *H04W 88/02*     (2009.01)

(52) U.S. Cl.
    CPC ............ *G06V 10/955* (2022.01); *G06V 20/60* (2022.01); *H04W 88/02* (2013.01)

(58) Field of Classification Search
    CPC ..... H04L 67/06; H04L 67/125; H04L 67/131; G06Q 20/3224; G06Q 20/123; G06Q 20/3278; G06Q 20/18; G06T 11/60
    See application file for complete search history.

(56) References Cited

U.S. PATENT DOCUMENTS

| | | |
|---|---|---|
| 2013/0051615 A1 | 2/2013 | Lim et al. |
| 2014/0016846 A1* | 1/2014 | Blaskovics ........... G06T 7/0012 382/128 |
| 2014/0267770 A1 | 9/2014 | Gervautz et al. |
| 2014/0282234 A1* | 9/2014 | Ku ........................ H04W 4/60 715/835 |
| 2015/0149941 A1* | 5/2015 | Itagaki ................ G06F 3/04886 715/765 |
| 2015/0331711 A1* | 11/2015 | Huang .................... G06F 9/542 719/320 |
| 2016/0239284 A1* | 8/2016 | Boudville ............... H04L 67/34 |
| 2017/0171037 A1* | 6/2017 | Tanaka ................... H04L 41/50 |

FOREIGN PATENT DOCUMENTS

| | | |
|---|---|---|
| CN | 104424033 A | 3/2015 |
| CN | 104834382 A | 8/2015 |
| CN | 105144197 A | 12/2015 |
| CN | 105677025 A | 6/2016 |
| CN | 106506960 A | 3/2017 |
| CN | 107256334 A | 10/2017 |
| CN | 107783715 A | 3/2018 |

\* cited by examiner

Mobike

Liangxiang Yancunqiao ⎯⎯ Chengnanjiayuanbei

Liangxiang Yancunqiao

First Service 5:30 Last Service 21:00

DEVICE FOR RECOGNIZING APPLICATION IN MOBILE TERMINAL AND TERMINAL

CROSS-REFERENCE TO RELATED APPLICATIONS

This application is a continuation of International Application No. PCT/CN2018/121856, filed on Dec. 18, 2018, the disclosure of which is hereby incorporated by reference in its entirety.

TECHNICAL FIELD

This application relates to the field of mobile terminal technologies, and in particular, to a device for recognizing an application in a mobile terminal and a terminal.

BACKGROUND

With the development of intelligent mobile terminal technologies, more applications and functions are installed in intelligent mobile terminals. The intelligent mobile terminals have been integrated into every aspect of daily life, and can meet various requirements of users. For example, a user may use a shared bicycle through a mobile terminal, may make payment through a mobile terminal, or may take public transportation through a mobile terminal.

However, with the development of mobile terminal technologies and application development technologies, users also pose higher requirements for convenience of using applications in mobile terminals. Currently, if a user wants to use an application in a mobile terminal, the user generally needs to find, on a main interface or an application interface of the mobile terminal, an icon of the application that the user wants to use and taps the icon. When a relatively large quantity of applications are installed in the mobile terminal, a process of searching for the icon of the application may be time-consuming. To simplify user operations, a virtual key may be further set, so that the user implements quick startup of the application by touching the virtual key. However, a display interface of the mobile terminal may be cluttered. Alternatively, a corresponding touch trajectory may be further preset for the application. As shown in FIG. 1, a preset correspondence between touch trajectories and applications is stored in a memory in the mobile terminal. After the user inputs the touch trajectory, the touch trajectory input by the user is sequentially matched with the touch trajectories in the correspondence. If the matching succeeds, the corresponding application is activated. However, the user needs to remember the touch trajectories corresponding to all applications, which increases a memory burden of the user. In addition, in the foregoing two manners, fingerprint recognition may be further added. To be specific, when the user performs a same operation by using different fingers, the different fingers may correspond to different applications. However, in some scenarios, the fingers of the user may be inconvenient to perform operations on the mobile terminal. For example, when the user wears a glove in cold weather, the user needs to take off the glove first, or when the fingers of the user are excessively wet, excessively dry, or sticky with something, fingerprints may fail to be recognized.

SUMMARY

Embodiments of this application provide a device for recognizing an application in a mobile terminal and a terminal, so that the mobile terminal can automatically recognize a to-be-activated application, and processing efficiency can be improved.

According to a first aspect, an embodiment of this application provides a device for recognizing an application in a mobile terminal. The device includes: a signal processing device, configured to process data from an image sensor to obtain an image; a coprocessor, configured to recognize the image to obtain a first image category, and search a database by using the first image category to obtain a first application corresponding to the first image category, where a plurality of image categories and an application corresponding to each image category are preset in the database; and a main processor, configured to receive an identifier of the first application from the coprocessor, and activate the first application or prompt a user to download the first application.

In the device, the coprocessor obtains the image from the signal processing device, and then recognizes the image and determines the first application corresponding to the image, and the main processor activates the first application or prompts the user to download the first application. The device can relatively accurately determine, based on the image from the image sensor, an application that the user may want to use, and activate the application. In this process, the user does not need to tap an application icon, thereby simplifying user operations. In addition, the coprocessor implements feature extraction on the image and determines a to-be-activated application, and the main processor does not need to perform a related operation, so that processing efficiency is high, and power consumption is reduced.

Optionally, the main processor may be in a low power consumption state before receiving the identifier of the first application from the coprocessor. Power consumption of the low power consumption state is lower than that when the main processor runs a processing program. For example, the low power consumption state is an idle state, a dormant state, or a sleep state. Further, before receiving the identifier of the first application, the main processor may be woken up by the coprocessor or woken up by the identifier of the first application, to perform a subsequent operation.

In a possible implementation, the signal processing device is an image signal processor (ISP) or a sensor processor.

In a possible implementation, the coprocessor is a neural processing unit (NPU), a digital signal processor (DSP), a graphic processing unit (GPU), or a hardware accelerator.

In a possible implementation, the coprocessor is specifically configured to recognize the image by using an artificial intelligence (AI) image recognition algorithm, to obtain the first image category, to relatively accurately activate, by using the AI algorithm, the application that the user needs to use.

In a possible implementation, after receiving the identifier of the first application from the coprocessor, the main processor is further configured to: determine whether the first application is installed in the terminal; and activate the first application when determining that the first application is installed; when the first application is not installed in the terminal but a second application is installed, activate the first application by using a built-in interface of the first application in the second application; or when determining that the first application is not installed, prompt the user to download the first application.

In a possible implementation, when activating the first application, the main processor is specifically configured to start the first application or switch the first application from background running to foreground running.

In a possible implementation, the image sensor collects data based on a preset period. In other words, a process of collecting data by the image sensor does not need to be triggered by the user each time, but is automatically implemented by the device.

In a possible implementation, the signal processing device is specifically configured to process data from the image sensor periodically to obtain an image, and a processing period of the signal processing device may be the same as a collection period of the image sensor. Alternatively, the signal processing device may be in an always on state, and process data from the image sensor in real time to obtain an image.

In a possible implementation, the device may further include a transceiver, configured to receive some or all content in the database from a server. In this embodiment, the some or all content in the database is downloaded from the server, and the device or the terminal does not need to perform sample training to obtain all content in the database.

In a possible implementation, the device may be a chip in the mobile terminal, and the chip includes at least the main processor, the coprocessor, and the signal processing device. Further, the chip may further include the transceiver, a memory, and the like.

According to a second aspect, an embodiment of this application provides a mobile terminal. The mobile terminal includes an image sensor and the device according to the first aspect or any one of the possible implementations of the first aspect. The image sensor is configured to collect data periodically or in real time.

According to a third aspect, an embodiment of this application further provides a non-transitory computer storage medium. The storage medium stores a software program. When being read and executed by a coprocessor, the software program can implement the function performed by the coprocessor in the first aspect or any design of the first aspect.

According to a fourth aspect, an embodiment of this application further provides a computer program product. When the computer program product is run on a coprocessor, the coprocessor can perform the function performed by the coprocessor in the first aspect or any design of the first aspect.

DESCRIPTION OF EMBODIMENTS

The following further describes in detail embodiments of this application with reference to accompanying drawings.

Various applications installed in a mobile terminal can provide different aspects of convenience for a user, and meet different requirements of the user in different scenarios. For example, a bicycle sharing application may enable the user to conveniently use a public bicycle; a payment application may enable the user to make payment through the mobile terminal without carrying cash, bank cards, and the like; and a bus query application may enable the user to conveniently query a bus route and a running status.

Because a process of starting an application in the related art is relatively complex, a conventional manner for activating an application still has some limitations. To improve processing efficiency while simplifying user operations and improving user experience, the embodiments of this application provide a device for recognizing an application in a mobile terminal and a mobile terminal. The device may be a circuit board, a circuit system, a chip, or a chipset in the mobile terminal, may run necessary software, and is configured to perform an operation related to application activation. The software includes but is not limited to driver software, operating system software, and application software. The mobile terminal is a removable electronic device, and may optionally include or not include a communication capability. The communication capability may be mobile communication or short-range communication. When the mobile terminal has no communication capability, the mobile terminal is equivalent to a removable local device. The mobile terminal needs to have a photographing capability, for example, a built-in camera, namely, a sensor lens used for photographing a picture. The mobile terminal includes but is not limited to a mobile phone, a tablet computer, a personal digital assistant (PDA), a laptop computer, or a wearable device.

Figure 2:
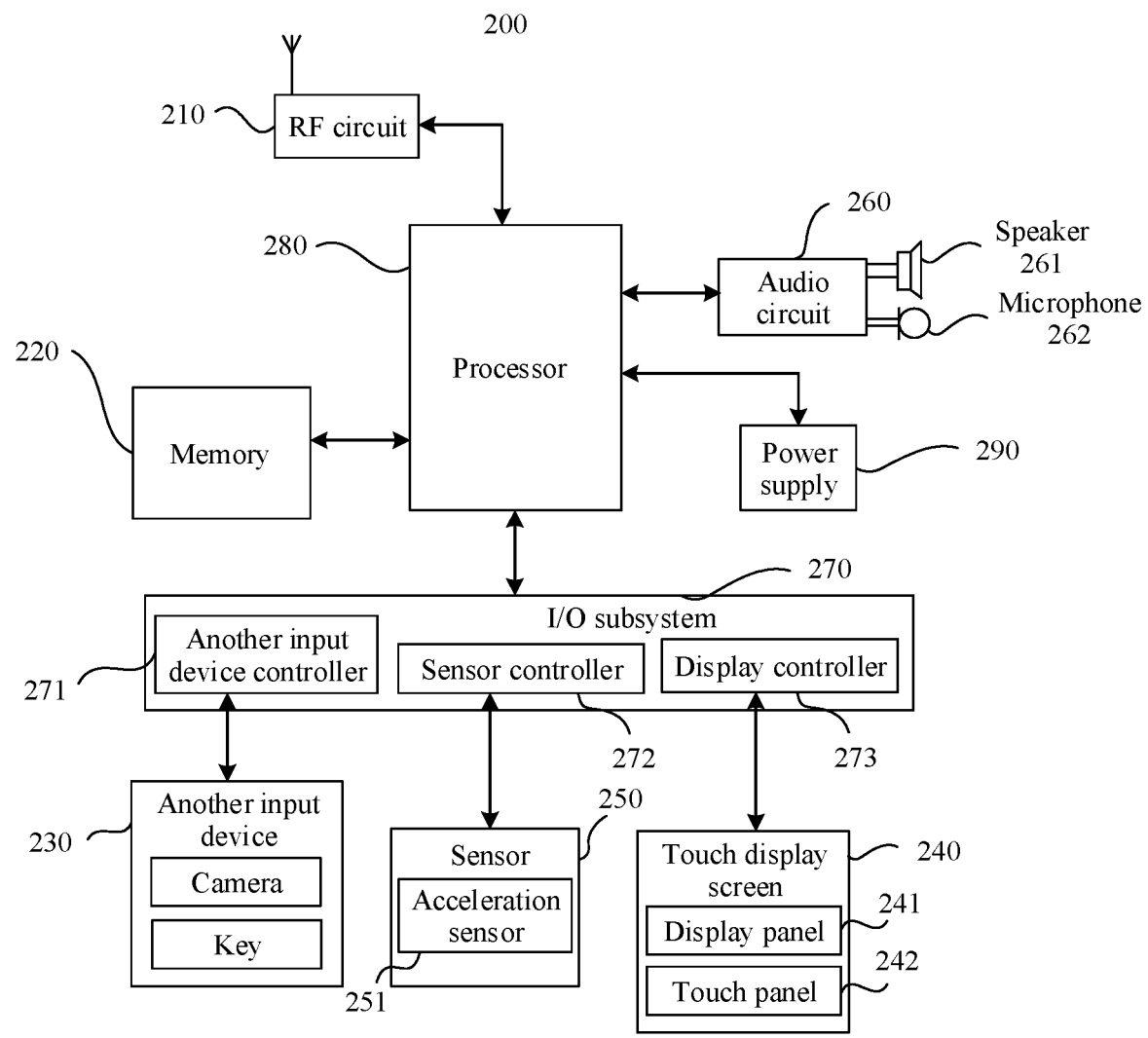
FIG. 2 is a schematic structural diagram of a mobile terminal according to an embodiment of this application.

For example, the mobile terminal is a mobile phone. FIG. 2 shows a possible partial structure of a mobile phone 200. As shown in the figure, the mobile phone 200 includes components such as a radio frequency (RF) circuit 210, a memory 220, another input device 230, a touch display screen 240, a sensor 250, an audio circuit 260, an I/O subsystem 270, a processor 280, and a power supply 290. A person skilled in the art may understand that the structure of the mobile phone shown in FIG. 2 does not constitute a limitation on the mobile phone, and may include more or fewer components than those shown in the figure, or combine some components, or split some components, or have different component arrangements. The following specifically describes the components of the mobile phone 200 with reference to FIG. 2.

The RF circuit 210 may be configured to receive and send information, or receive and send a signal in a call process. Specifically, after receiving downlink information of a base station, the RF circuit 210 sends the downlink information to the processor 280 for processing. In addition, the RF circuit 210 sends designed uplink data to the base station. Generally, the RF circuit includes but is not limited to an antenna, at least one amplifier, a transceiver, a coupler, a low noise amplifier (LNA), a duplexer, and the like. In addition, the RF circuit 210 may further communicate with a network and another device through wireless communication. The wireless communication may use any communications standard or protocol, including but not limited to global system for mobile communications (GSM), general packet radio service (GPRS), and code division multiple access (CDMA), wideband code division multiple access (WCDMA), long term evolution (LTE), email, short messaging service (SMS), and the like.

The memory 220 may be configured to store a software program and a module. The processor 280 executes various function applications and data processing of the mobile phone 200 by running the software program and the module stored in the memory 220. The memory 220 may mainly include a program storage area and a data storage area. The program storage area may store an operating system, an application required by at least one function (for example, a sound playback function or an image playback function), and the like. The data storage area may store data (for example, audio data or a phone book) created based on use of the mobile phone 200. In addition, the memory 220 may include a power-down volatile memory or a non-power-down volatile memory. The memory 220 may be a read-only memory (ROM) or another type of static storage device that may store static information and instructions, a random access memory (RAM) or another type of dynamic storage device that may store information and instructions, an electrically erasable programmable read-only memory (EEPROM), or any other medium that can be used to carry or store expected program code in a form of an instruction or a data structure and that can be accessed by a computer, but is not limited thereto.

The another input device 230 may be configured to receive input digital or character information, and generate a key signal input related to user setting and function control of the mobile phone 200. Specifically, the another input device 230 may include but is not limited to one or more of a physical keyboard, a function key (for example, a volume control key or an on/off key), a joystick, and the like. In some embodiments of the present invention, the another input device may further include an image sensor (a camera), configured to collect an image. The another input device 230 is connected to another input device controller 271 of the I/O subsystem 270, and performs signal interaction with the processor 280 under control of the another input device controller 271.

The touch display screen 240 may be configured to display information input by a user or information provided for a user and various menus of the mobile phone 200, and may further receive a user input. Specifically, the touch display screen 240 may include a display panel 241 and a touch panel 242. The display panel 241 may be configured in a form of a liquid crystal display (LCD), an organic light emitting diode (OLED), or the like. The touch panel 242, also referred to as a touchscreen, a touch-sensitive screen or the like, may collect a contact or a non-contact operation performed by a user on or near the touch panel 242 (for example, an operation performed by the user on or near the touch panel 242 by using any suitable object or accessory such as a finger or a stylus, or a somatic operation, where the operation includes an operation type such as a single-point control operation and a multi-point control operation), and drive a corresponding connection apparatus based on a preset program. Optionally, the touch panel 242 may include two parts: a touch detection apparatus and a touch controller. The touch detection apparatus detects a touch orientation and a gesture of the user, detects a signal brought by a touch operation, and transmits the signal to the touch controller. The touch controller receives touch information from the touch detection apparatus, converts the touch information into information that can be processed by the processor, and then sends the information to the processor 280, and can receive and execute a command sent by the processor 280. In addition, the touch panel 242 may be implemented by using a plurality of types, such as a resistive type, a capacitive type, an infrared type, and a surface acoustic wave type, or may be implemented by using any technology developed in the future. Further, the touch panel 242 may cover the display panel 241, and the user may perform, based on content displayed on the display panel 241 (the displayed content includes but is not limited to a soft keyboard, a virtual mouse, a virtual key, an icon, and the like), an operation on or near the touch panel 242 covered on the display panel 241. After detecting the operation on or near the touch panel 242, the touch panel 242 transmits the operation to the processor 280 by using the I/O subsystem 270 to determine the user input. The processor 280 then provides a corresponding visual output on the display panel 241 by using the I/O subsystem 280 based on the user input. Although in FIG. 2, the touch panel 242 and the display panel 241 are used as two independent components to implement input and input functions of the mobile phone 200, in some embodiments, the touch panel 242 and the display panel 241 may be integrated to implement input and output functions of the mobile phone 200.

The mobile phone 200 may further include at least one sensor 250, for example, an acceleration sensor 251, an optical sensor, and another sensor. Specifically, the acceleration sensor 251 may detect magnitudes of accelerations in all directions (generally three-axis), may detect magnitudes and directions of gravity when stationary, and may be used for an application of recognizing postures of the mobile phone (for example, landscape/portrait switching, related games, and magnetometer posture calibration), functions related to vibration recognition (for example, pedometer and knocking), and the like. The optical sensor may include an ambient light sensor and a proximity sensor. The ambient light sensor may adjust brightness of the touch display screen 240 based on brightness of ambient light. The proximity sensor may turn off a screen and/or backlight when the mobile phone 200 is moved to an ear. Other sensors such as a gyroscope, a barometer, a hygrometer, a thermometer, and an infrared sensor may be further configured for the mobile phone 200, and are not described herein again.

The audio circuit 260, a speaker 261, and a microphone 262 may provide an audio interface between the user and the mobile phone 200. The audio circuit 260 may transmit a signal obtained after received audio data is converted to the speaker 261, and the speaker 261 converts the signal into a sound signal for output. On the other hand, the microphone 262 converts the collected sound signal into a signal, and the audio circuit 260 receives the signal and converts the signal into audio data, and then outputs the audio data to the RF circuit 210 to send the audio data to, for example, another mobile phone, or outputs the audio data to the memory 220 for further processing.

The I/O subsystem 270 is configured to control an input/output external device, and may include another input device controller 271, a sensor controller 272, and a display controller 273. Optionally, one or more other input device controllers 271 receive a signal from the another input device 230 and/or send a signal to the another input device 230. The another input device 230 may include a physical button (a press button, a rocker button, or the like), a dial pad, a slide switch, a camera, or the like. It should be noted that the another input device controller 271 may be connected to any one or more of the foregoing devices. The display controller 273 in the I/O subsystem 270 receives a signal from the touch display screen 240 and/or sends a signal to the touch display screen 240. After the touch display screen 240 detects the user input, the display controller 273 converts the detected user input into interaction with a user interface object displayed on the touch display screen 240, namely, implements human-computer interaction. The sensor controller 270 may receive a signal from one or more sensors 250 and/or send a signal to one or more sensors 250.

The processor 280 is configured to serve as a control center of the mobile phone 200, connect all parts of the entire mobile phone by using various interfaces and lines, and execute various functions and data processing of the mobile phone 200 by running or executing the software program and/or the module stored in the memory 220 and invoking data stored in the memory 220, thereby monitoring the entire mobile phone. Optionally, the processor 280 may include one or more processing units, or one or more processors. Preferably, the processor 280 may integrate an application processor and a modem processor, where the application processor mainly processes an operating system, a user interface, an application, and the like, and the modem processor mainly processes wireless communication. It may be understood that the modem processor may not be integrated into the processor 280. The processor 280 may further include a processing function unit mentioned in subsequent embodiments.

The mobile phone 200 further includes the power supply 290 (for example, a battery) that supplies power to the components. Preferably, the power supply may be logically connected to the processor 280 by using a power management system, to implement functions such as charging, discharging, and power consumption management by using the power management system. Although not shown, the mobile phone 200 may further include other modules such as a Bluetooth module.

Figure 1:
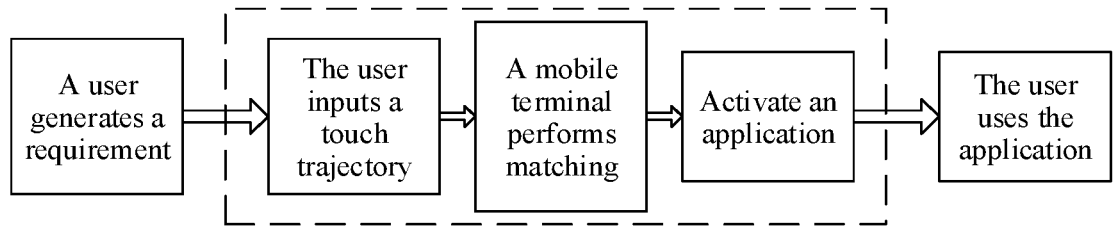
FIG. 1 is a schematic flowchart of activating an application.
Figure 3:
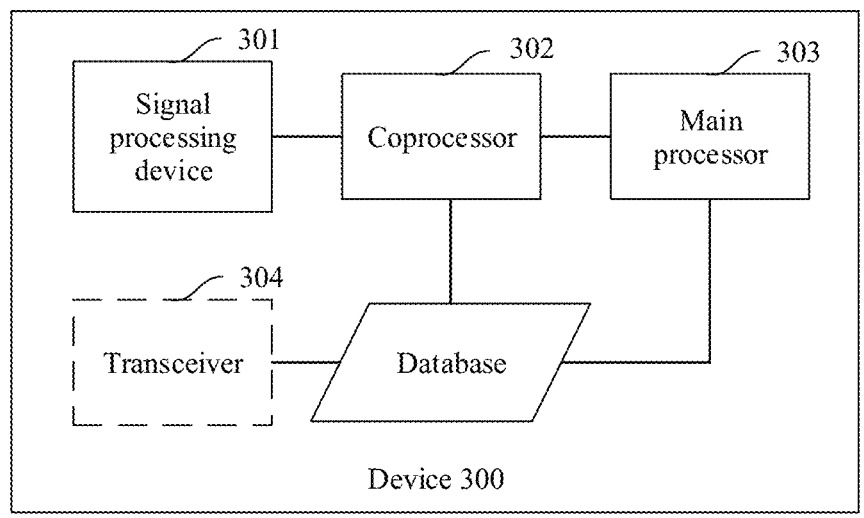
FIG. 3 is a schematic structural diagram of a device for recognizing an application in a mobile terminal according to an embodiment of this application.

A schematic structural diagram of a device 300 for recognizing an application in a mobile terminal provided in an embodiment of this application may be shown in FIG. 3. The device 300 includes a signal processing device 301, configured to process data from an image sensor to obtain an image. The image sensor may be an image sensor in the sensor lens previously mentioned, and is configured to receive an optical signal transmitted by a lens in the sensor lens and convert the optical signal into an electrical signal. The electrical signal may be a digital signal or an analog signal, and these signals are processed by the signal processing device 301 as data to obtain the image. The device 300 further includes a coprocessor 302, configured to recognize the image obtained by the signal processing device 301, to obtain a first image category; and search a database by using the first image category, to obtain a first application corresponding to the first image category, and may further send an identifier corresponding to the first application to a main processor 303. At least one image category and an application corresponding to each of the at least one image category are preset in the database. The database may be located in a memory, and the memory may also be located in the mobile terminal, for example, the memory 220 corresponding to FIG. 1. The device 300 further includes the main processor 303, configured to receive the identifier of the first application from the coprocessor 302, and activate the first application or prompt a user to download the first application.

As described above, the processor 280 in the mobile phone 200 may include one or more processors. Therefore, when the device 300 is applied to the mobile phone 200, the coprocessor 302 and the main processor 303 correspond to different processors in the processor 280 in the mobile phone 200. The signal processing device 301 is separately coupled to the image sensor and the another input device controller 271 in the mobile phone 200, to obtain the data from the image sensor, and enable the coprocessor 302 to obtain the image. Alternatively, the signal processing device 301 may be one of the processors in the processor 280. Optionally, the database may be stored in the memory in the mobile terminal. The memory may further store necessary software required for running the coprocessor 302 and the main processor 303, for example, driver software, operating system software, or application software.

The solutions in the foregoing embodiment of this application are described by using an example. The image categories and an application corresponding to each image category stored in the database may be shown in Table 1. The coprocessor 302 recognizes an image to determine whether the image includes an image category in Table 1.

TABLE 1

| Identifier | Image Category | Application |
| --- | --- | --- |
| 01 | Yellow shared bicycle | ofo bicycle |
| 02 | Orange shared bicycle | Mobike |
| 03 | Blue shared bicycle | Bluegogo |
| 04 | Subway entrance | Easy Access |
| 05 | Collection QR code | Alipay (or WeChat) |
| 06 | Barcode scanner | Alipay (or WeChat) |
| 07 | Bus stop sign | Here Comes the Bus |
| ... | ... | ... |

Figure 4A:
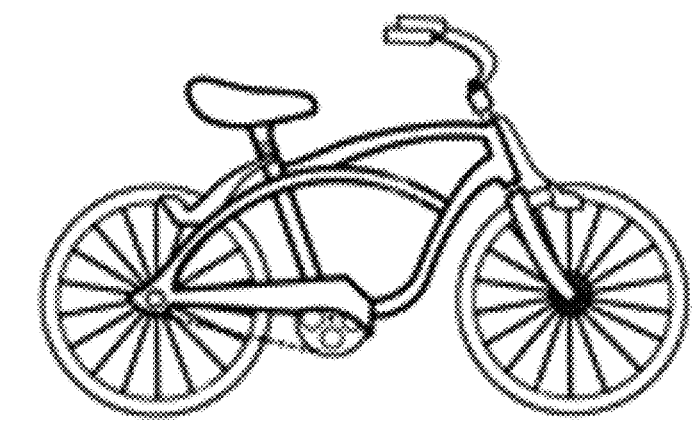
FIG. 4a and FIG. 4b are schematic diagrams of a collected image and a corresponding activated application according to an embodiment of this application.
Figure 4B:
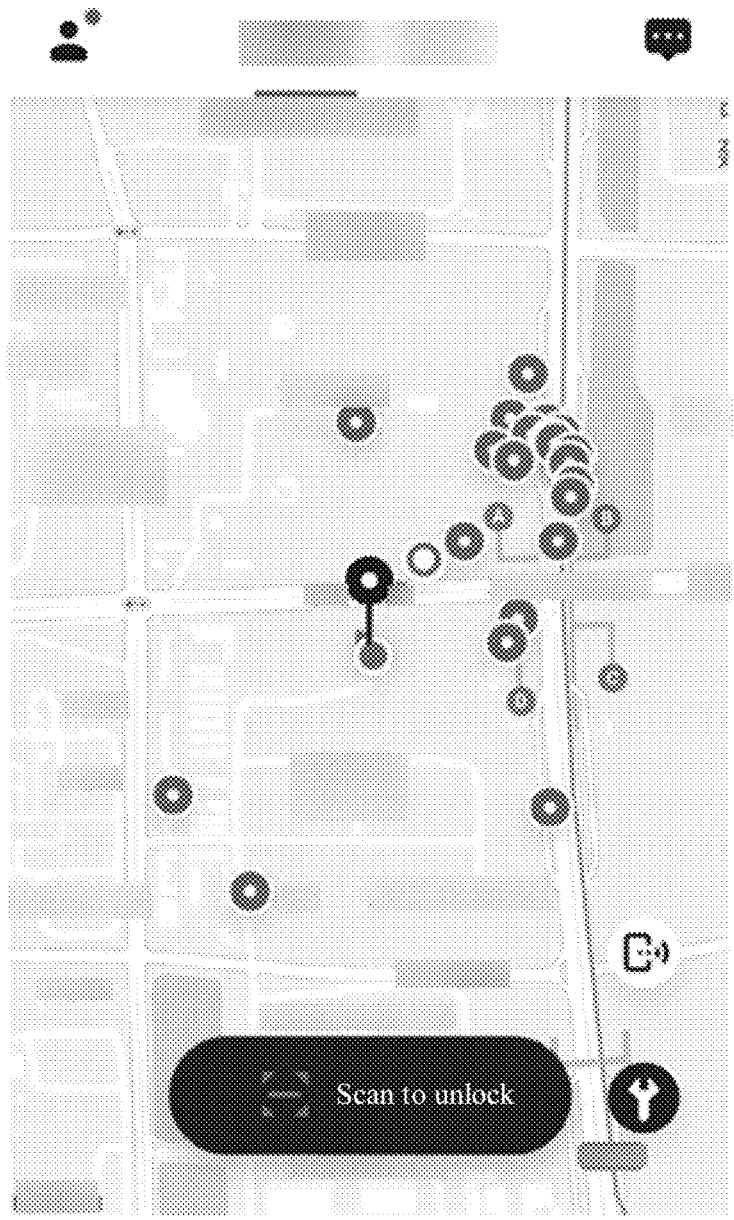

For example, in a scenario in which an orange shared bicycle appears, the user may need a Mobike bicycle. Therefore, a "Mobike" program is set to an application corresponding to the orange shared bicycle. If the image obtained by the coprocessor 302 is shown in FIG. 4a, the coprocessor 302 recognizes that an orange shared bicycle exists in the image, namely, determines that the first image category of the image is the orange shared bicycle, and determines, based on Table 1, that the orange shared bicycle corresponds to the application "Mobike". The coprocessor 302 may notify the main processor 303 of the identifier "02", and the main processor 303 determines that the application corresponding to the identifier "02" is "Mobike" and that the application "Mobike" has been installed in the mobile terminal in which the device 300 is located. In this case, the main processor 303 activates the application "Mobike", and content presented by the mobile terminal to the user is shown in FIG. 4b. If the application "Mobike" is not installed in the mobile terminal, the main processor may prompt, through the display screen of the mobile terminal, the user whether to download the application "Mobike".

Figure 5A:
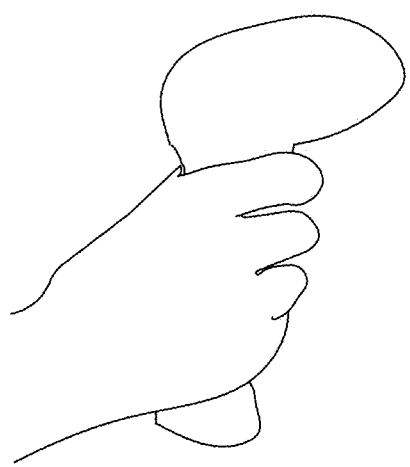
FIG. 5a and FIG. 5b are schematic diagrams of a collected image and a corresponding activated application according to an embodiment of this application.
Figure 5B:
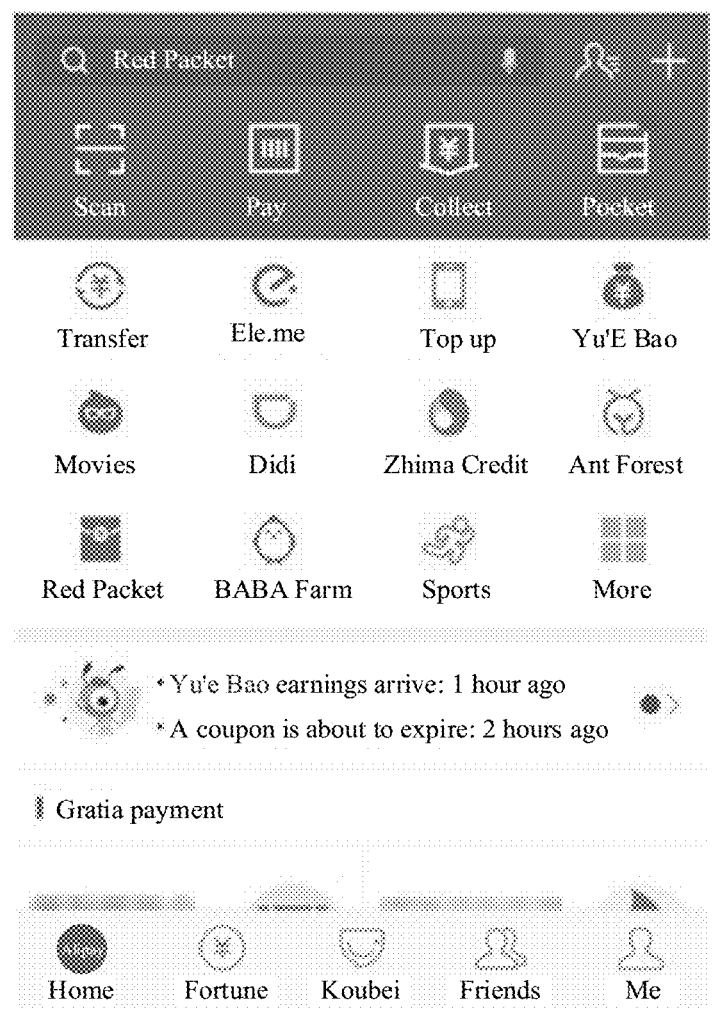

For another example, in a scenario in which a barcode scanner appears, the user may need to make payment. Therefore, an application "Alipay" that can make payment is set to an application corresponding to the barcode scanner. If the image obtained by the coprocessor 302 is shown in FIG. 5a, the coprocessor 302 recognizes that the first image category of the image is a barcode scanner, and determines, based on Table 1, that the barcode scanner corresponds to the application "Alipay". The coprocessor 302 may notify the main processor 303 of the identifier "06", and the main processor 303 determines that the application corresponding to the identifier "06" is "Alipay". In this case, the main processor 303 activates the application "Alipay", and content presented by the mobile terminal to the user is shown in FIG. 5b. If the application "Alipay" is not installed in the mobile terminal, the main processor may prompt, through the display screen of the mobile terminal, the user whether to download the application "Alipay".

It should be understood that Table 1 is merely an example, and the image categories and the corresponding applications may include the content shown in Table 1, but are not limited thereto. In addition, the column "identifier" is also an option. If the option exists, communication between the coprocessor 302 and the main processor 303 may be simplified. In other words, the coprocessor 302 may notify the main processor of the identifier of the determined application. If the option does not exist, the coprocessor 302 may also notify, in another manner, a to-be-activated application of the main processor of recognition information corresponding to the image, for example, send a name of the application or image category information to the main processor 303.

Further, a same image category may also correspond to a plurality of applications. For example, if the image category recognized by the coprocessor 302 is a "collection QR code" or a "barcode scanner", the user may need to make payment, and both the application "Alipay" and the application "WeChat" can implement payment. In this case, the two applications may be associated to the same image category and different priorities may be set for the two applications. If "Alipay" has a higher priority, the main processor 303 preferably activates the application "Alipay" when the application "Alipay" has been installed in the mobile terminal, or activates the application "WeChat" when the application "Alipay" is not installed. The priority may be set when the correspondence between the image category and the application is determined, or may be set by the user after the mobile terminal obtains the correspondence between the image category and the application.

Figure 6:
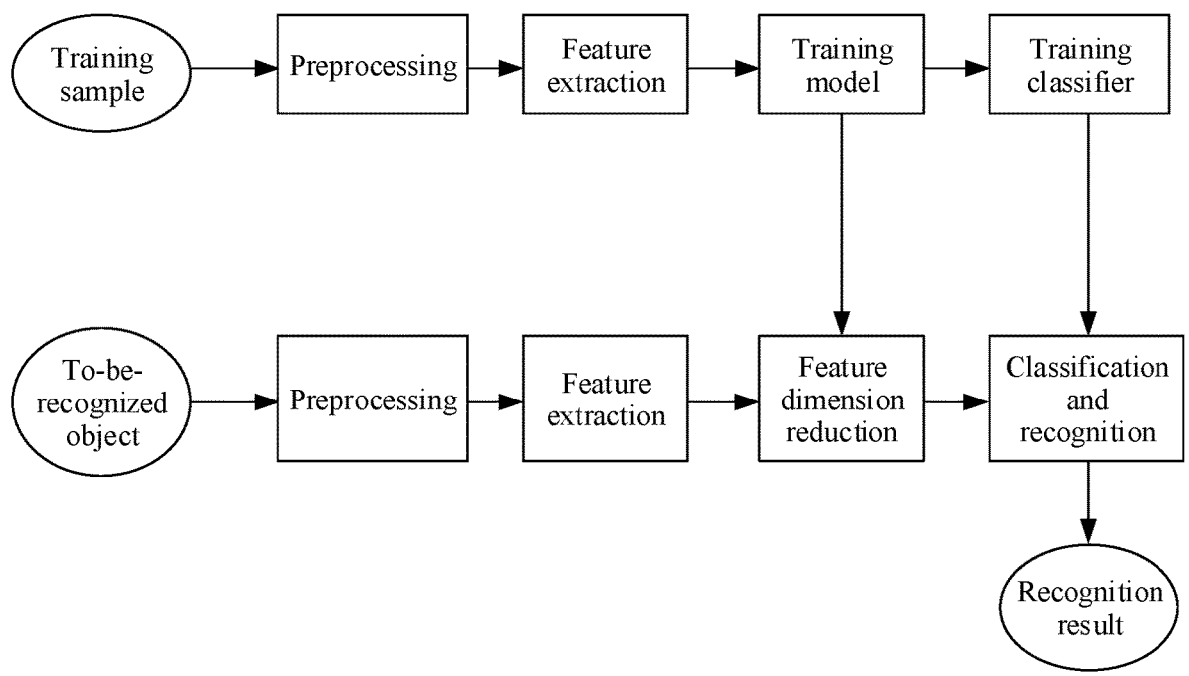
FIG. 6 is a schematic flowchart of an AI image recognition technology according to an embodiment of this application.

When processing the image, the coprocessor 302 may recognize the image by using an AI image recognition algorithm, to obtain the first image category. A process of an AI image recognition technology may be shown in FIG. 6, and includes a training process and a recognition process. In the training process, a large quantity of to-be-trained images are first obtained, namely, training samples are obtained, then preprocessing and feature extraction are performed on the sample images to obtain an image training model, and the processed image training model is processed by using a deep learning engine, for example, engine software of the coprocessor 302, to obtain a training classifier. For example, if a to-be-trained image category is a yellow shared bicycle, a larger quantity of images of yellow shared bicycles are first obtained. The obtained images may include images of yellow shared bicycles photographed from different angles and in different scenarios. Then, preprocessing such as difference, noise reduction, or sharpening is performed on each image separately, and feature extraction is performed on the preprocessed image. In other words, features about the yellow shared bicycles in the image are extracted. Then, training is performed based on the features about the yellow shared bicycles extracted from each image, to obtain a training model of the yellow shared bicycles, and a classifier of the yellow shared bicycles is trained based on the training model. The training model and the classifier may exist in a software model manner, and are stored in the memory in the mobile terminal, to be invoked by the coprocessor 302 subsequently.

In the recognition process, a to-be-recognized image is first obtained, preprocessing and feature extraction operations are performed on the to-be-recognized image, dimension reduction processing is performed on extracted features, and then matching is performed with the training model and the training classifier that are obtained in the training process, to obtain a recognition result. The training process may be completed offline by a server, and then the model and the classifier that are obtained through training are sent to the mobile terminal, to be stored in the memory in the mobile terminal. The coprocessor 302 in the mobile terminal performs the recognition process on the obtained image, to determine whether the matching succeeds. If the matching succeeds, the coprocessor obtains a first image category of the image through recognition; and then, searches, based on the first image category, the database for a first application corresponding to the first image category, and sends an identifier of the first application to the main processor 303.

After receiving the identifier of the first application, the main processor 303 activates the first application if determining that the first application is installed in the mobile terminal. Specifically, if the first application has been installed in the mobile terminal, the first application may not be run when the main processor 303 receives the identifier of the first application, and the main processor 303 may run the first application in the foreground. Alternatively, the first application may be in a background running state when the main processor 303 receives the identifier of the first application, and the main processor 303 may switch the first application from background running to foreground running, namely, display a user interface of the first application through the display screen of the mobile terminal, so that the user can perform an operation on the first application. Further, if the first application is not installed in the mobile terminal, the main processor 303 may prompt, through the display screen of the mobile terminal, whether to download the first application.

In another possible implementation, if the first application is not installed in the mobile terminal, but a second application is installed in the mobile terminal, and the second application has a built-in interface of the first application, the main processor 303 may further activate the first application by using the built-in interface of the first application in the second application.

For example, an installation-free application, also referred to as an applet, is gradually favored by users because of advantages of no installation, instant use, and release of storage space after closing. Specifically, an application A has a built-in interface of an application B. The user may tap an icon of the application B in the application A, and the mobile terminal loads and runs a program package of the application B. Because the program package of the application B is relatively small and may be downloaded quickly, and an installation process is avoided, the user can quickly use the application B to achieve the instant use effect. Therefore, if the main processor 303 receives an identifier of the application B, even if the application B is not installed in the mobile terminal, the application A has the built-in interface of the application B, the main processor may activate the application B by using the application A, to avoid increasing storage burden on the mobile terminal. Optionally, if both a to-be-activated first application and a second application with a built-in interface of the first application have been installed in the mobile terminal, priorities may be further set for different activation manners. For example, considering the limitation of the applet on the size of the program package, function perfection of the applet may be worse than that of a normally installed application. Therefore, a high priority may be set for directly activating the first application, and a low priority may be set for activating the first application by using the second application.

In a possible implementation, the device 300 may further include a transceiver 304, configured to receive some or all content in the database from the server. As described above, the server may complete a model training process, and then send a model obtained through training to the mobile terminal. The mobile terminal may receive, by using the transceiver 304 in the device 300, the first image category (namely, the training model) sent by the server and a correspondence between the first image category and the first application. Specifically, the transceiver 304 may be a wired transceiver, namely, receive content in the database through wired transmission, or the transceiver 304 may be a wireless transceiver, namely, receive content in the database through wireless transmission, for example, an RF circuit in the mobile phone 200.

In another possible implementation, the training process may alternatively be completed by a provider of each application, and a model obtained through training is carried in an installation package of the application. If the mobile terminal has downloaded and installed the application, the coprocessor 302 may obtain an image category corresponding to the application. Therefore, if the coprocessor 302 recognizes, from the image, the image category that exists in the database, the application corresponding to the image category is installed in the mobile terminal.

To further improve accuracy of activating the application, the correspondence between the image categories and the applications stored in the database may further include location information. In a specific embodiment, the image categories and an application corresponding to each image category stored in the database may be shown in Table 2.

TABLE 2

| Identifier | Image Category | Location Information | Application |
|---|---|---|---|
| 01 | Yellow shared bicycle | — | ofo bicycle |
| 02 | Orange shared bicycle | — | Mobike |
| 03 | Blue shared bicycle | — | Bluegogo |
| 04 | Subway entrance | Beijing | Easy Access |
| 05 | Subway entrance | Shanghai | Metro Metropolis |
| 06 | Bus stop sign | Beijing | Beijing Real-Time Bus |
| 07 | Bus stop sign | Shanghai | Shanghai Bus Query |
| ... | ... | ... | ... |

For example, for scenarios of taking the subway by scanning a QR code, the application "Easy Access" can only be used currently in Beijing, while the application "Metro Metropolis" can only be used currently in Shanghai. Therefore, if the user wants to scan the QR code to get into a subway station in Beijing, but the mobile terminal starts the application "Metro Metropolis", the application cannot provide the service for the user.

For another example, currently, many bus applications can provide the user with information about a running route of a bus and a current location of the bus, to make it convenient for the user to take a bus and estimate a waiting time. However, each bus application has some limitations. For example, bus routes of each city can be basically queried in the application "Here Comes the Bus", but bus location information of each city cannot be queried. In Beijing, if bus location information of a bus route needs to be queried, the application "Beijing Real-Time Bus" may be used, but bus information in other cities cannot be queried in the application.

Therefore, when the coprocessor 302 determines the first application corresponding to the first image category, if matching of the location information of the mobile terminal is increased, accuracy of activating the application can be improved. The location information may be implemented by a positioning device in the mobile terminal, for example, the global positioning system (global positioning system, GPS) or the Beidou navigation satellite system.

To further improve user experience, after activating the determined first application, the main processor 303 may further open a page required by the user. In a specific embodiment, the image categories and an application corresponding to each image category stored in the database may be shown in Table 3.

TABLE 3

| Identifier | Image Category | Application | Page |
|---|---|---|---|
| 01 | Orange shared bicycle | Mobike | Scan-to-unlock page. |
| 02 | Subway entrance | Easy Access | QR code ride page |
| 03 | Barcode scanner | Alipay | QR code payment page |
| 04 | Payment QR code | Alipay | Scan page |
| ... | ... | ... | |

Figure 7:
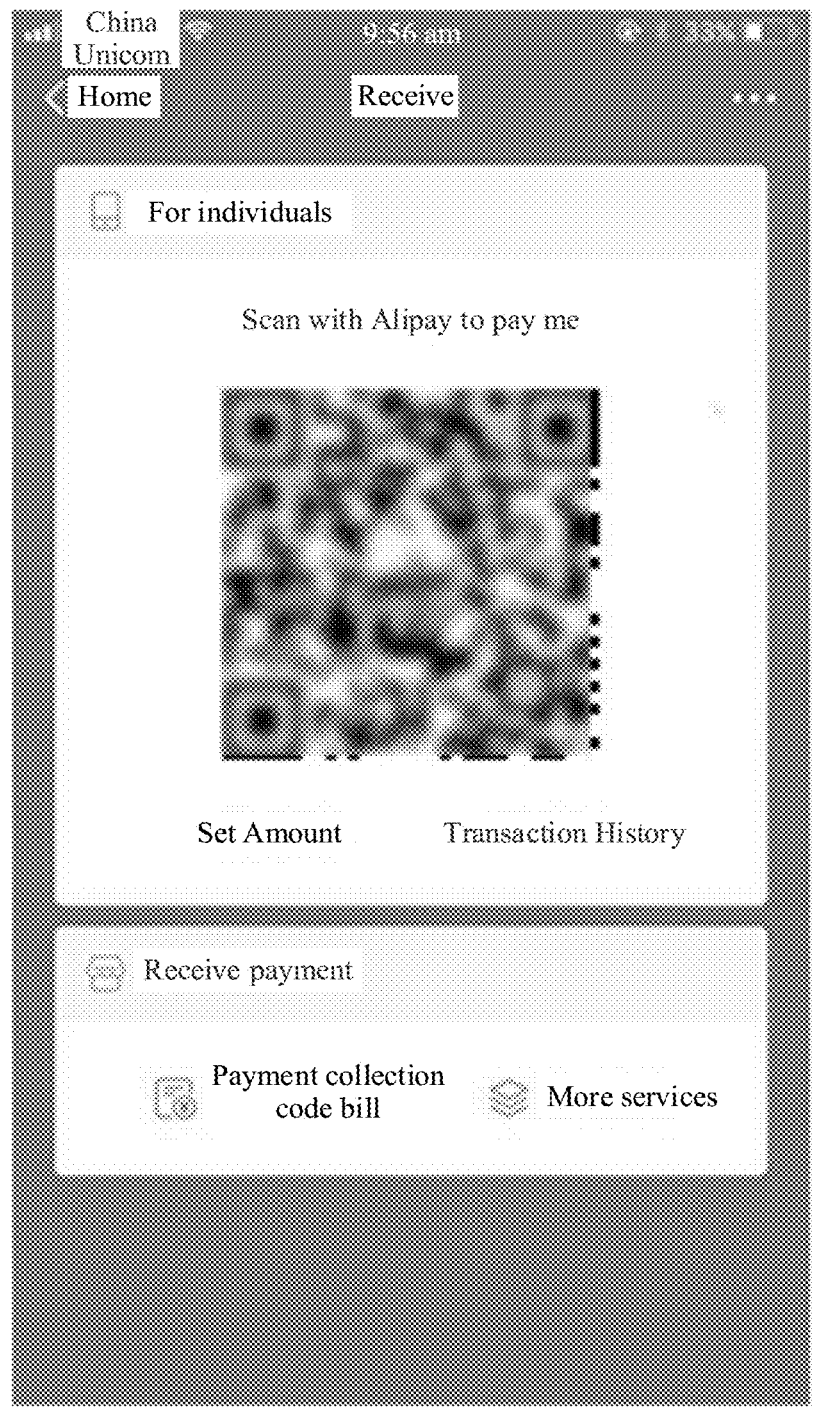
FIG. 7 is a schematic diagram of activating an application according to an embodiment of this application.
Figure 8A:
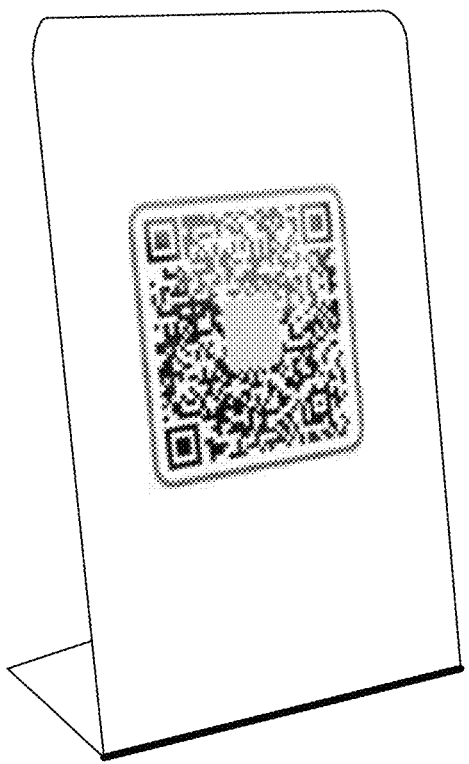
FIG. 8a and FIG. 8b are schematic diagrams of a collected image and a corresponding activated application according to an embodiment of this application.
Figure 8B:
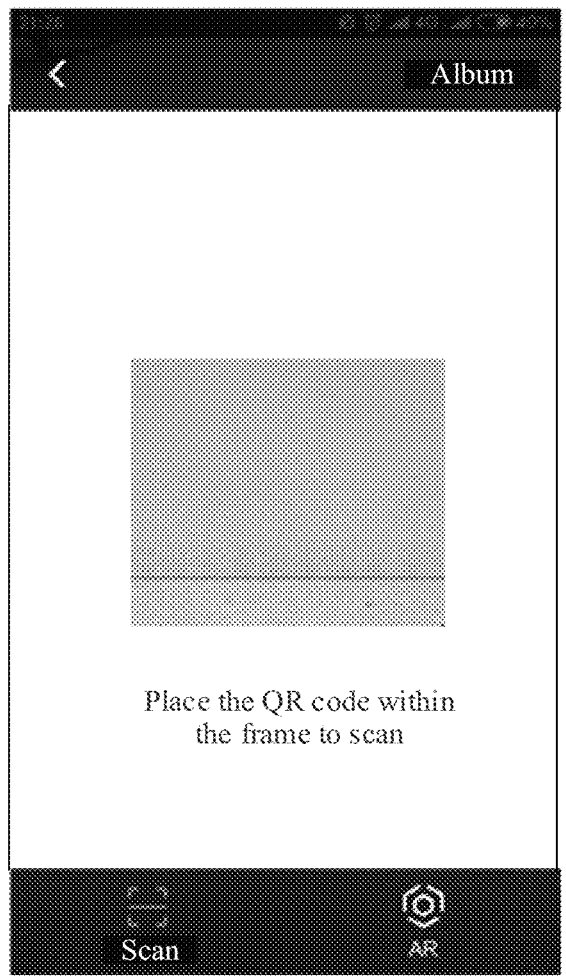

For example, because a scenario in which a "barcode scanner" or a "payment QR code" appears is usually a scenario in which the user needs to make payment, an application corresponding to the "barcode scanner" or the "payment QR code" is "Alipay" that can be used for payment. In other words, when the coprocessor 302 recognizes that the first image category is a "barcode scanner" or a "payment QR code", the main processor 303 activates the application "Alipay". If activating the application "Alipay" is switching the application "Alipay" from background running to foreground running, a page currently displayed to the user is a page used by the user last time, but the page may not be a payment page required by the user. If activating the application "Alipay" is starting an application that is not running, the page currently displayed to the user is a home page of the application. However, the user needs to use the application "Alipay" to make payment. In other words, the user needs a payment page in the application "Alipay". To make it convenient for the user to use, this embodiment may be further improved as follows. If the image obtained by the coprocessor 302 is still shown in FIG. 5a, the recognized image category is a "barcode scanner", the user may need a "payment QR code" page, and the main processor 303 may further open a "payment" page for the user after activating the application "Alipay". In this case, a page displayed by the mobile terminal is shown in FIG. 7. If the image obtained by the coprocessor 302 is shown in FIG. 8a, the recognized image category is a "payment QR code", and the main processor 303 may further open a "scan" page for the user after activating the application "Alipay", as shown in FIG. 8b. This embodiment can further simplify user operations and improve user experience.

Figure 9A:
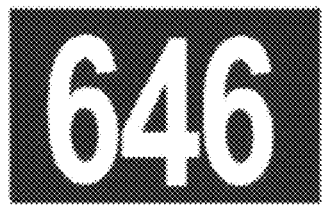
FIG. 9a and FIG. 9b are schematic diagrams of a collected image and a corresponding activated application according to an embodiment of this application.
Figure 9A:
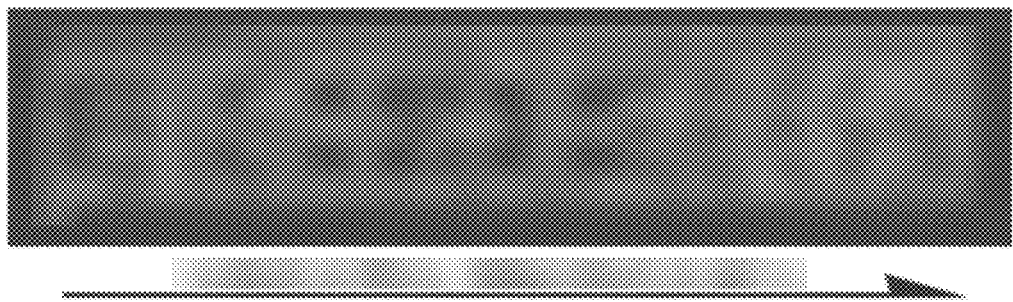
Figure 9B:
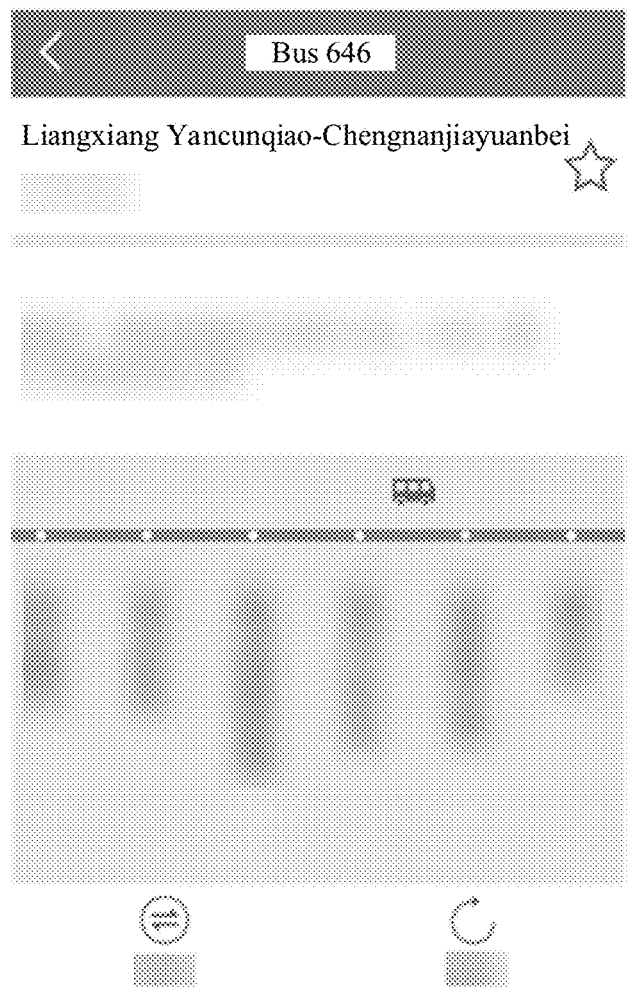

In some scenarios, the user may need to use an application to perform information query. Therefore, after activating the corresponding application, the main processor 303 may further perform search based on information extracted from the image. For example, if the image obtained by the coprocessor 302 is shown in FIG. 9a, the recognized first image category is a "bus stop sign", and the number "646" is extracted from the image. The main processor 303 receives information about the identifier of the first application and extracted feature information that are sent by the coprocessor 302, namely, the identifier of the application "Beijing Real-Time Bus" and the extracted number "646". The main processor 303 activates the application "Beijing Real-Time Bus", and searches the application for "646", to display current information about the bus No. 646 for the user, as shown in FIG. 9b.

In a possible design, the device 300 may be one or more chips. For example, the signal processing device 201, the coprocessor 302, and the main processor 303 are integrated into one chip, and the chip is disposed in the mobile terminal. The image sensor is further disposed in the mobile terminal in which the chip is disposed, but the image sensor may not be disposed on the same chip as the device 300.

For example, the signal processing device 201 may be an ISP, and may be configured to perform processing, such as automatic exposure control (AEC), automatic gain control (AGC), automatic white balance (AWB), color correction, lens shading correction, gamma correction, and defect pixel removal, on an image collected by the image sensor. Alternatively, the signal processing device 201 may be a sensor signal processor whose functions are similar to those of the ISP, and processes an image collected by the image sensor. Optionally, the ISP may be located in the processor 280, or optionally, the ISP may be located outside the processor 280.

The main processor 303 may be a central processing unit (CPU), an application processor, or a microprocessor in the mobile terminal, and is located in the processor 280. When the main processor 303 works normally, power consumption is higher than that when the coprocessor 302 works normally. Therefore, the coprocessor 302 processes the obtained image, and when determining that an application needs to be activated, the coprocessor 302 indicates the main processor to perform an operation of activating the application.

Optionally, before receiving the identifier of the first application from the coprocessor 302, the main processor 303 may be in a low power consumption state, and power consumption when the main processor 303 is in the low power consumption state is lower than that when the coprocessor 302 runs a processing program. For example, the low power consumption state may be an idle state, a dormant state, or a sleep state. The main processor 303 may be woken up by the coprocessor 302 by receiving the identifier of the first application, or the main processor 303 may be woken up by the coprocessor 302 in another manner, such as an interrupted notification manner, and further receive the identifier of the first application, to comply with a subsequent operation. This is not limited in this embodiment.

The coprocessor 302 may be a neural processing unit, a digital signal processor, a graphic processing unit, a hardware accelerator, or the like, and power consumption of the coprocessor 302 during working may be lower than that of the main processor 303. The coprocessor 302 may be located in or outside the processor 280. This is not limited in this embodiment. Because the power consumption of the coprocessor 302 is relatively low, even if the coprocessor is set to an always on processor, power consumption of the mobile terminal is not greatly affected. To further improve user experience, the foregoing embodiment of this application may be applied to a case in which the screen of the mobile terminal is off or locked and on. Generally, when the mobile terminal is in a screen off state, the main processor 303 is in a dormant state, to reduce power consumption. In this case, because of the relatively low power consumption, the coprocessor may be in a working state even when the screen of the mobile terminal is locked or off, and less power is consumed.

In a possible design, the image sensor may always be in an on state to collect data in real time; or the image sensor may collect data based on a preset period, namely, automatically collect data at regular intervals. Therefore, a camera or lens carrying the image sensor may be considered to be in an always on state, to recognize an ambient environment in real time and activate an application in time, thereby improving user experience. The process of collecting data by the image sensor is not triggered by the user each time, but is implemented automatically by the device. The preset period may be a fixed period, or a plurality of periods may be set for the image sensor, and different periods are used based on different environments. For example, if ambient light is stronger, a user requirement may be generated at any time, and a preset period of 0.1 s may be used; or if ambient light is weaker, a user requirement is less likely to be generated, and a preset period of 1 s may be used in this case. In a possible design, the signal processing device 201 may alternatively process the obtained data in real time or periodically, and process the obtained data, so that the coprocessor 302 performs further recognition. If both the image sensor and the signal processing device 201 are configured to collect data or process data based on a preset period, a same period or different periods may be configured for the image sensor and the signal processing device 201.

Further, an embodiment of this application further provides a computer storage medium. The storage medium stores a software program. When being read and executed by a coprocessor, the software program may implement the function performed by the coprocessor in any one of the foregoing embodiments. An embodiment of this application further provides a computer program product. When the computer program product is run on a coprocessor, the coprocessor is enabled to perform the function performed by the coprocessor in any one of the foregoing embodiments. The computer storage medium includes the memory 220 mentioned in the foregoing embodiment, and may store related software data of the corresponding database in FIG. 3. Details are not described herein again. Therefore, the coprocessor and the related software may be used as an independent product, and are configured to implement the image recognition mentioned in the foregoing embodiment to find a function of a corresponding first application, so that an identifier of the first application is sent by the coprocessor to a main processor. Therefore, software run by the coprocessor may include a plurality of software modules, including but not limited to a recognition module configured to recognize an image and a search module configured to search for a corresponding application. This is not limited in this embodiment.

It will be appreciated that persons skilled in the art can make various modifications and variations to the embodiments disclosed in this application without departing from the scope of this application. This application is intended to cover these modifications and variations provided that they fall within the scope of protection defined by the following claims and their equivalent technologies.

What is claimed is:

1. A device, comprising:
   a signal processing device configured to process data from an image sensor to obtain an image;
   a coprocessor configured to:
      determine a first image category based on the image; and
      determine a first application corresponding to the first image category using a database, wherein the database includes a preset correspondence between the first image category and the first application; and
   a main processor configured to:
      receive an identifier of the first application from the coprocessor and information extracted from the image;
      activate the first application; and
      after activating the first application, perform searching with respect to the first application based on the information extracted from the image.

2. The device according to claim 1, wherein the signal processing device is an image signal processor (ISP) or a sensor processor.

3. The device according to claim 1, wherein the coprocessor is a neural processing unit, a digital signal processor, a graphic processing unit, or a hardware accelerator.

4. The device according to claim 1, wherein determining the first image category based on the image utilizes an artificial intelligence (AI) image recognition algorithm.

5. The device according to claim 1, wherein the main processor is further configured to:
   after receiving the identifier of the first application from the coprocessor, determine whether the first application is installed on the device; and
   based on determining that the first application is installed on the device, activate the first application.

6. The device according to claim 1, wherein the main processor is further configured to:
   after receiving the identifier of the first application from the coprocessor, determine whether the first application is installed on the device; and
   based on determining that the first application is not installed on the device but that a second application is installed on the device, activate the first application by using a built-in interface of the first application in the second application.

7. The device according to claim 1, wherein the main processor is further configured to:
   after receiving the identifier of the first application from the coprocessor, determine whether the first application is installed on the device; and
   based on determining that the first application is not installed on the device, prompt the user to download the first application.

8. The device according to claim 1, wherein activating the first application comprises:
   starting the first application or switching the first application from background running to foreground running.

9. The device according to claim 1, wherein determining the first application corresponding to the first image category using the database is further based on location information of the device.

10. The device according to claim 1, wherein the signal processing device is configured to process data from the image sensor periodically or in real time.

11. The device according to claim 1, further comprising:
    a transceiver configured to receive database content from a server.

12. A mobile terminal, comprising:
    an image sensor configured to collect data periodically or in real time;
    a signal processing device configured to process the data to obtain an image;
    a coprocessor configured to:
       determine a first image category based on the image; and
       determine a first application corresponding to the first image category using a database, wherein the database includes a preset correspondence between the first image category and the first application; and
    a main processor configured to:
       receive an identifier of the first application from the coprocessor and information extracted from the image;
       activate the first application; and
       after activating the first application, perform searching with respect to the first application based on the information extracted from the image.

13. The mobile terminal according to claim 12, wherein the signal processing device is an image signal processor (ISP) or a sensor processor.

14. The mobile terminal according to claim 12, wherein the coprocessor is a neural processing unit, a digital signal processor, a graphic processing unit, or a hardware accelerator.

15. The mobile terminal according to claim 12, wherein determining the first image category based on the image utilizes an artificial intelligence (AI) image recognition algorithm.

16. The mobile terminal according to claim 12, wherein the main processor is further configured to:
    after receiving the identifier of the first application from the coprocessor, determine whether the first application is installed on the mobile terminal; and
    activate the first application in case the first application is installed on the mobile terminal, activate the first application by using a built-in interface of the first application in a second application in case the first application is not installed on the mobile terminal but is accessible via the built-in interface of the first application in the second application, or prompt the user to download the first application in case the first application is not installed on the mobile terminal and is not accessible through another application via a built-in interface.

17. The mobile terminal according to claim 12, wherein activating the first application comprises:
    starting the first application or switching the first application from background running to foreground running.

18. The mobile terminal according to claim 12, wherein determining the first application corresponding to the first image category using the database is further based on location information of the mobile terminal.

19. The mobile terminal according to claim 12, wherein the signal processing device is configured to process data from the image sensor periodically or in real time.

20. The mobile terminal according to claim 12, further comprising:
    a transceiver configured to receive database content from a server.

21. A device, comprising:
a signal processing device configured to process data from an image sensor to obtain an image;
a coprocessor configured to:
- determine a first image category based on the image; and
- determine a first application corresponding to the first image category using a database, wherein the database includes a preset correspondence between the first image category and the first application; and a main processor configured to:
- receive an identifier of the first application from the coprocessor;
- after receiving the identifier of the first application from the coprocessor, determine whether the first application is installed on the device; and
- based on determining that the first application is not installed on the device but that a second application is installed on the device, activate the first application by using a built-in interface of the first application in the second application.

* * * * *